INVENTORS
DONALD W. COLE &
HOWARD H. POWELL
BY
ATTORNEY

United States Patent Office 2,937,437
Patented May 24, 1960

2,937,437
METHOD AND APPARATUS FOR HOLDING A WORK-PIECE

Donald W. Cole, Weatherford, and Howard H. Powell, Fort Worth, Tex., assignors to General Dynamics Corporation, San Diego, Calif., a corporation of Delaware Filed Jan. 9, 1957, Ser. No. 633,214

5 Claims. (Cl. 29—424)

The present invention relates generally to work-holding apparatus and more particularly to novel means for fixedly restraining a part to be machine upon the bed of a milling or profiling machine or upon any bed required to support a part during a work operation thereupon.

The evolution of aircraft and missiles to their present state where they are required to operate at very high speeds, great altitudes and over long ranges has necessitated many changes in manufacturing techniques and equipment. To achieve an aircraft or missile which will satisfy the stringent operational demands made of it, the structural components of such vehicles, particularly those components that are exposed to aerodynamic flow, must be capable of withstanding the very high temperatures generated by air friction; have inherent insulating characteristics and possess an optimum strength to weight ratio. The use of a structural composite type of member, usually designated as of cellular cored sandwich construction, and comprising a honeycomb-like cellular core element, having two facings of sheet material or face plates, is generally accepted by those skilled in the art of aircraft structural design as being most conducive to the achievement of such design desiderata. The cellular core element of said structural composite is normally manufactured in block or rectangular form and must subsequently be machine-profiled to conform to the shape of aircraft component to which it is to be adapted. However, it has been found that conventional mechanical chucking or gripping devices and methods are not readily adapted for holding cellular core during a machining operation nor do they efficiently maintain the exacting dimensional tolerances required for aircraft parts.

Accordingly, the present invention is directed to a means and method for chucking or rigidly holding various materials during the working thereof, which means and method find particular usefulness in chucking low density materials, such as cellular core and other intricate or fragile substances, to a platen or other suitable chucking bed. In carrying out the present invention a fluid medium subject to being frozen and thawed is employed so that alternate gelid hardening and calefacient fusion of such medium will alternately seize a work-piece to rigidly adhere it to a platen or other work base and then release it from its affixed condition to the platen after the desired machining operation has been accomplished. Such release is readily attained, being effected by a rapid reversement of the temperature cycle and resultant fusion of the work holding medium from its solid to its liquid state.

A primary object of the present invention is to provide a novel apparatus and method for rigidly adhering a work-piece to a chucking bed or platen for the purpose of being machined to a profile, or for being planed, shaped, turned or otherwise worked, and then quickly releasing such work-piece upon completion of the work operation.

Another object of the invention is to provide a machine chucking apparatus and method of unique form which employs cyclic refrigeration and calefaction of a fluid chucking medium for alternately seizing and holding and then releasing a work-piece.

A further object of the invention is to provide an apparatus and method of the above class and character which is particularly adapted for the chucking of cellular core and other low density materials, that may be intricate or fragile and which materials, while being machined, may be unsupported at their cutting plane.

Yet another object of the invention resides in a means and method for chucking materials to be machine that is well adapted for operational conformance to production cycles, is relatively simple and economical to construct and operate and can be easily maintained in good working order.

Other objects and advantages of the invention will be readily apparent to those skilled in the art from the following specification and appended drawings wherein is illustrated a preferred form of the invention, and in which.

The drawings illustrate a preferred embodiment of the invention which includes refrigeration and calefaction means for changing a fluid chucking medium, such as water, into ice, its solid state, and, when required, melting the ice into water by applying a temperature differential to the water, together with an improved machine-tool platen or bed adapted for use with the fluid chucking medium.

Figure 1:
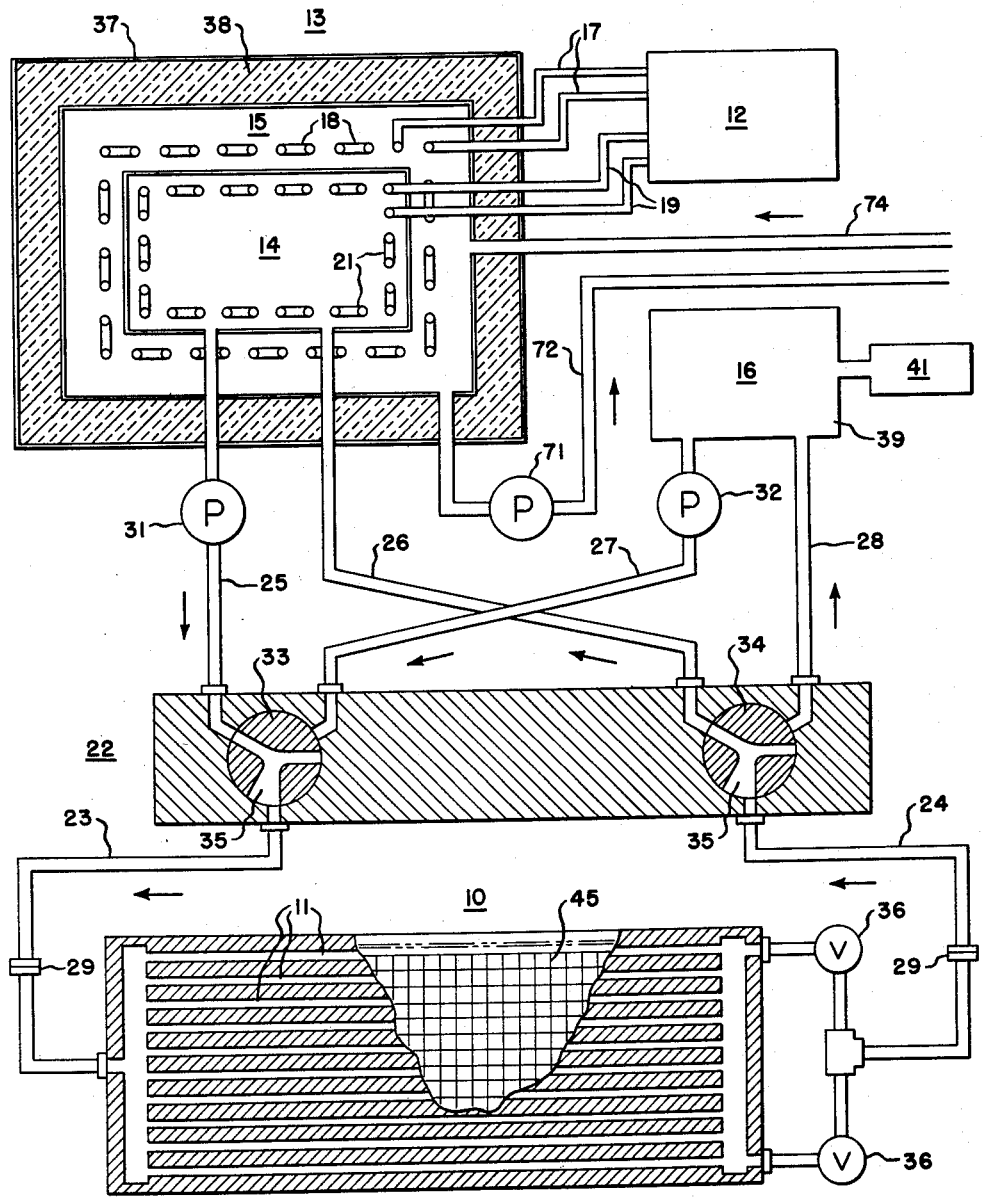
Figure 1 is a diagrammatic representation of a system in accordance with the present invention for chucking or affixing work-pieces to be machined.

Referring first to Figure 1, the invention is shown as embodying a platen assembly or work-holding bed 10, having a plurality of longitudinally extending passageways or cavities 11 in manifold relationship, appropriately located internally therewithin to serve as conduits for a coolant and heating fluid medium. Associated with the platen assembly 10 are a usual refrigeration plant 12, a dual chambered coolant unit 13 which includes an inner primary coolant tank and fluid reservoir 14 for containing and refrigerating a suitable fluid cooling medium and a secondary coolant tank 15 in surrounding relationship to the primary tank 14 for accommodating an auxiliary fluid cooling medium, and a calefacient unit 16 for cyclic heating of the refrigerated coolant supplied by the primary coolant tank 14.

Refrigeration plant 12 is suitably connected by a pair of conduits 17 to conventional refrigerating coils 18 in the secondary coolant tank 15 for circulation of a refrigerant therethrough, and is further connected by a pair of conduits 19 to conventional coils 21 in the primary coolant tank 14 for providing refrigerant to such coils.

A valving unit 22 is conveniently located between the platen assembly 10 and the coolant unit 13 and the calefaction unit 16, being interconnected with the platen 10 by a pair of conduits 23 and 24, interconnected with the primary coolant tank 14 of unit 13 by a pair of conduits 25 and 26 and interconnected with the calefaction unit 16 by a pair of conduits 27 and 28. A conventional flexible coupling 29 is provided in each of the conduits 23 and 24 for ease of accommodating these fluid lines to platen assembly 10. Conduits 25 and 27 include respectively a pump 31 and a pump 32, which are of conventional construction, with pump 31 provided for circulation of coolant between the coolant unit 13 and the platen assembly 10, and pump 32 for circulation of a coolant between the calefaction unit 16 and the platen assembly 10.

Valving unit 22 embodies an inlet valve 33 and an outlet valve 34, which are conventional three-way type valves and which are simultaneously actuable between their different valving positions by suitable external operating means, not shown.

Inlet valve 33 and outlet valve 34 are provided with passageways 35 which are of generally T-shape. When valves 33 and 34 are rotated in a clockwise direction, as viewed in Figure 1, from their neutral positions a first fluid connection is effected between outlet conduit 25 of primary coolant tank 14 and inlet conduit 23 of platen assembly 10 and a second fluid connection is effected between the outlet conduit 24 of platen assembly 10 and inlet conduit 26 of coolant tank 14. Simultaneously with the operation of the valves 33 and 34 a usual limit switch, not shown, associated with pump 31 is actuated to start pump 31 to flow fluid from the primary tank 14 to platen assembly 10 and return. It is noted that the coolant after passage through platen assembly 10 is ported to a pair of conventional pressure valves 36 which are in fluid connection with outlet conduit 24 and which are adjustable to maintain the desired fluid pressure in the platen thereby to effect a more efficient heat transfer. Thus a circulating path or "cold" circuit for the coolant fluid of tank 14 is provided between tank 14 and platen assembly 10. It is obvious that reverse rotation of valves 33 and 34 will serve to provide a fluid connection between outlet conduit 27 of calefaction unit 16 and also between inlet conduit 23 of platen assembly 10 and outlet conduit 24 of platen assembly 10 and inlet conduit 28 of calefaction unit 16. This effects a "hot" circuit for the fluid of calefaction unit 16. In this "hot" circuit there is located pump 32, which also has a limit switch, not shown, associated with it, which switch is actuated simultaneously with the reverse operation of the valves 33 and 34 to start pump 32 to circulate heated fluid from calefaction unit 16 to platen assembly 10.

Thus there is illustrated in Figure 1 a closed circulating fluid system which is adapted to accommodate a suitable fluid medium, such as ethylene glycol (commercially known under the trademark "Prestone") for effecting freezing or thawing temperatures at the work-supporting surface of the platen assembly 10 or work-holding bed member. Valving unit 22 by means of its valves 33 and 34 controls the flow of chilled fluid through the platen assembly 10 to provide a freezing condition at its work supporting surface to maintain a work-piece in affixed position as a machining operation is being accomplished. Alternately valving unit 22 controls the flow of heated fluid between the platen 10 and calefaction unit 16 to course it through the platen assembly 10 in a calefacient or defrosting cycle to release the work-piece when the work operation is completed. The same fluid medium is present in tank 14 and in calefaction unit 16, and this fluid medium operating at different temperature levels, is employed as a refrigerant, when provided by the tank 14, and as a calefactive agent, when provided by the calefaction unit 16, in effecting a desired temperature condition at the platen assembly 10.

Referring again to Figure 1, the primary coolant tank 14 of coolant unit 13 is, as shown, disposed within the secondary coolant tank 15, which, in turn, is encased in a housing 37. The space between the inner walls of housing 37 and the outer walls of the coolant tank 15 is filled with suitable thermal insulating material 38 to jacket the tanks 14 and 15 against environmental or external heat conditions.

Refrigeration unit 12 is of conventional construction and circulates usual refrigerant fluid through the coils 18 and 21 of tanks 14 and 15 to lower the temperature of the coolant fluids contained within each of these tanks. The particular composition of the fluids utilized in the system described does not form a part of the present invention. It is contemplated that any conventional, commercially available fluids which will provide the desired temperature effects may be employed. For example, Freon (dichlorodifluoromethane, $CCl_2F_2$) or Artic (methyl chloride, $CH_3Cl$) may be employed as the refrigerant circulated by refrigerating plant 12 and ethylene glycol, as stated above, may be used as the fluid medium with which tanks 14 and 15 and calefaction unit 16 are filled.

The temperature of the fluids contained in primary and secondary tanks 14 and 15 is preferably held at a temperature level well below the freezing point of water (preferably between 0° F. and 10° F.), conventional thermostatic control devices, not shown, being utilized for this purpose. It is understood, that the various fluid lines or conduits employed in the present system are all suitably thermally insulated.

Calefaction unit 16, comprising heating tank 39 and an expansion chamber 41, is, as has been stated, also provided with a supply of the same fluid medium, ethylene glycol, as is furnished by primary tank 14 and when the valves 33 and 34 are in proper position pump 32 circulates the fluid of this unit through platen assembly 10. Calefaction unit 16 may be of any conventional construction and may embody any suitable heating elements, which may be of the electrical type. Unit 16 will maintain its fluid medium at an elevated temperature, which desirably is thermostatically controlled to hold this temperature within the desired thawing temperature range.

Figure 3:
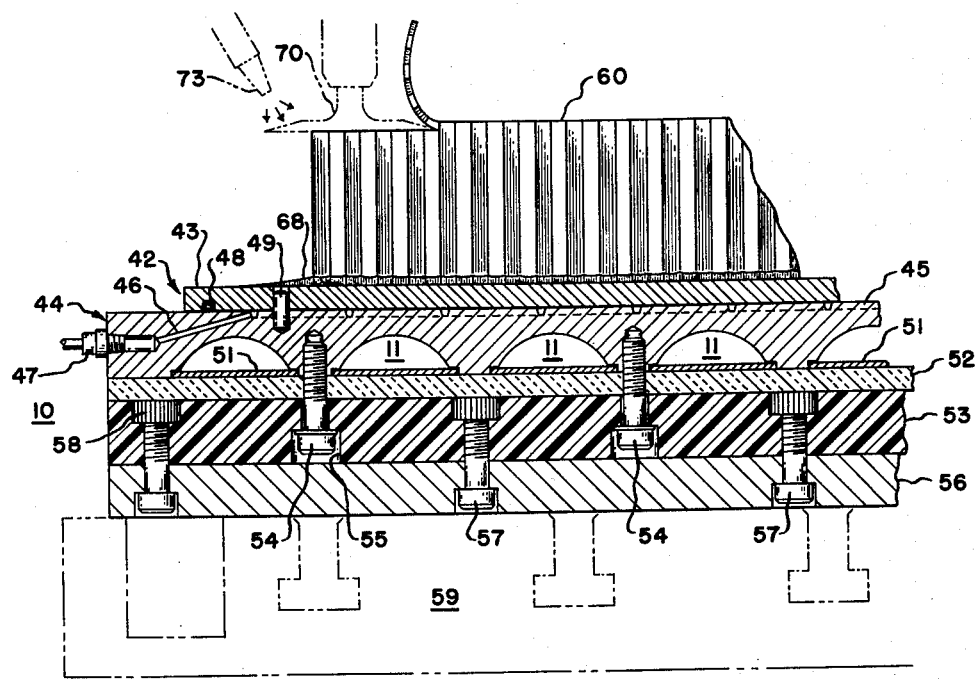
Figure 3 is an enlarged partial sectional view similar to Figure 2 and illustrates a cellular core work-piece affixed to the platen for machining of such work-piece with a rotary-disc type milling cutter.

Figure 3 illustrates the preferred construction of platen assembly 10. As shown platen assembly 10 comprises an overplaten 42 having an upper work supporting surface 43. Positioned directly beneath overplaten 42 is a main platen 44 which has its upper surface appropriately grooved to provide a usual vacuum grid 45. The outline area of vacuum grid 45 is smaller than is the outline area of overplaten 42 so that the latter completely covers this grid. Grid 45 is connected by a vacuum line 46 to a usual fitting 47 which in turn is connected to a conventional vacuum source, not shown, which supplies the vacuum which holds overplaten 42 in place on main platen 44. The lower surface of overplaten 42 is suitably grooved adjacent its periphery to accept a usual continuous sealing gasket 48 to provide an air-tight seal about the grid area. Locating pins 49 carried by main platen 44 and receivable by apertures in overplaten 42 serve to properly position the overplaten 42 with respect to main platen 44. When a work operation is contemplated air is evacuated through vacuum line 46 to provide a partial vacuum at grid 45, which partial vacuum is maintained throughout the work cycle and serves to rigidly hold overplaten 42 in position on main platen 44.

The lower surface of main platen 44 is suitably machined or otherwise worked to provide the plurality of parallel, longitudinally extending passageways or cavities 11. The size of cavities 11 and their number are such as to provide an even B.t.u. flow over the platen surface and also are adapted to meter the volumetric flow of the fluid medium therethrough. As shown, the cavities 11 are of semi-circular shape in cross-section and have their lateral open sides sealed by plates 51 which are suitably bonded in place in leakproof manner.

To minimize heat losses and effect a high degree of efficiency, a plate 52 conforming in size to main plate 44 and formed of suitable thermal insulation material, such as fiberglass, is located immediately beneath main platen 44. Another plate 53 of auxiliary insulation material, such as Micarta, is normally employed as a sub-base, being appropriately secured to main platen 44 by recessed cap screws 54, which also serve to retain the insulating plate 52 in place. The holes 55 which accommodate attaching screws 54 are slightly oversize to permit thermal expansion of the platen assembly under temperature extremes.

To complete platen assembly 10 there is provided a metallic attaching base plate 56 disposed beneath insulating sub-base 53 and attached thereto by means of recessed cap screws 57, which screws, as shown, engage splined nuts 58 pressed into the upper surface of sub-base 53.

In the platen assembly construction herein described there is no metal to metal contact between main platen 44 and base plate 56 so that heat losses by conduction are substantially eliminated. Attaching base plate 56 may be secured in any conventional manner to a usual movable machine bed 59, thereby to clamp the platen assembly 10 in position for a work-operation.

Figure 2:
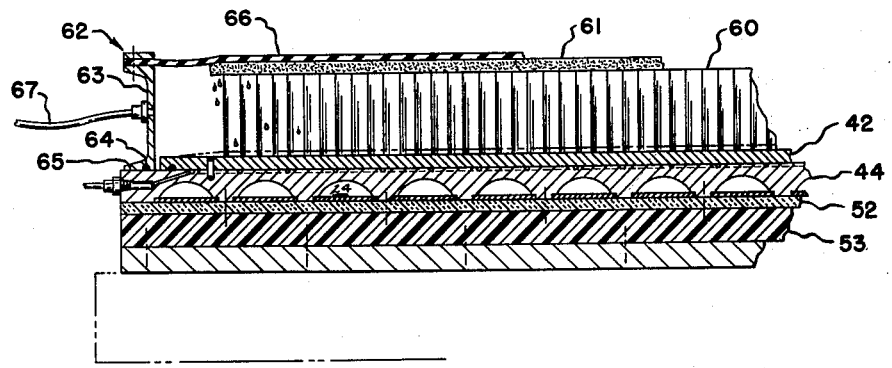
Figure 2 is a partial sectional view of a platen or work base used in the present invention and illustrates the freezing of a cellular core work-piece to the platen or work base.

Figure 2 illustrates a method of freezing a work-piece, indicated generally by the numeral 60 and herein assumed to be of cellular core construction, to the over-platen 42 prior to machining and Figure 3 illustrates a machining operation on work-piece 60 after it has been frozen in position.

In affixing work-piece 60 to overplaten 42 an initial above-freezing temperature must be effected in the overplaten to preclude the formation of frost or rime which would prevent locating the work-piece in direct contact with the working surface 43 of the overplaten. Thus valves 33 and 34 are actuated to provide fluid connection between primary coolant tank 14 and platen assembly 10 and pump 31 started to circulate the chilled coolant fluid through main platen 44. This primary coolant fluid passes through valve 33 and enters main platen 44 at its left hand end, as viewed in Figure 1, into an intake manifold area at such end and then flows through longitudinal cavities 11 to an outlet manifold area at the right hand end of main platen 44. It is then ported to the pressure valves 36 and therefrom to the return conduit 24 and through outlet valve 34 and thence back through conduit 26 to the primary coolant tank 14. After the primary coolant has circulated the required time to effect the desired cold temperature at overplaten 42 the circulating action may be stopped and the cellular core work-piece 60, which has first been dipped in water then located upon overplaten 42. A relatively thin, approximately one-quarter inch thick, felt pad 61, saturated with water, is now placed over the core 60, and a pressure diaphragm assembly 62 installed completely over the core 60 and overplaten 42. Pressure diaphragm assembly 62 comprises a rigid framework 63, which may be made of a plurality of suitably arranged channel irons, having a suitable sealing gasket 64 installed in its lower surface 65 which rests on main platen 44, and having an air-tight flexible membrane 66 extending between and affixed to the upper surfaces of the framework. The lower portion of framework 63 is preferably wetted, as with a coolant fluid medium, so that the pressure diaphragm assembly 62 will not be inadvertently frozen to the main platen 44. A vacuum line 67 is attached to framework 63 and opens to the space beneath membrane 66.

With the pressure diaphragm assembly 62 in place a partial vacuum is drawn, by conventional vacuum means, not shown. This action seats the lower surface of work-piece 60 in intimate contact with the working surface of the overplaten 42, and squeezes water out of the felt pad 61 to assure an adequate and uniform, but not excessive, supply of water for freezing the core to the overplaten.

Simultaneously with the evacuation of pressure diaphragm assembly 62 the circulation of the chilled coolant is started, thereafter this freezing cycle is maintained until the machining or profiling of the work-piece 60 has been completed. It has been found that a relatively thin layer of ice, indicated at 68, on the order of one-sixteenth of an inch, serves adequately to secure the work-piece in place while it is being worked.

After the work-piece 60 has been frozen in position the desired machining operation is performed as by means of a cutting tool 70, Figure 3. To assure efficiency of operation of the present invention the heat generated by the tool's cutting action is immediately dissipated as by flowing chilled coolant fluid from the secondary coolant tank 15 upon the tool. This coolant fluid is driven from tank 15 by a conventional pump 71 (Figure 1) through a fluid line 72 to a nozzle 73 (Figure 3) appropriately located relative to tool 70 as to direct the coolant at the tool. This coolant, if desired, may be suitably collected, filtered and returned through a fluid line 74 to tank 15 for re-chilling. It is understood that the capacity and efficiency of cooling of the secondary tank is sufficient that a supply of coolant adequate for a machining operation is readily available. It is also understood that any suitable fluid medium may be employed for cooling the tool provided that it is a fluid which embodies good flow characteristics at temperatures substantially below the freezing point of water, and which will not mingle with the ice in which the work-piece 60 is embedded, nor tend to thaw this ice.

After the work-piece 60 has been machined and is to be removed from overplaten 42, valves 33 and 34 of valve unit 22 are actuated in reverse direction to close the "cold" circuit to platen assembly 10 and establish fluid connection between platen assembly 10 and calefaction unit 16. Pump 31, of course is stopped, and pump 32 at this time comes on to circulate the heated fluid of the calefaction unit 16 through main platen 44 to defrost the overplaten 42 and melt the ice holding the work-piece 60 in place.

It is understood that the volume of chilled fluid in platen assembly 10 and in the fluid lines between valving unit 22 and platen assembly 10 is small as compared to the volume of the heated tank 39 of calefaction unit 16 or the volume of primary coolant tank 14, so that the amount of chilled fluid driven into the heated fluid tank 39 does not materially lower the temperature of the heated fluid therein; nor conversely, during the next freezing cycle does the volume of heated fluid driven into the primary coolant tank materially raise the temperature of the chilled fluid therein.

It will be readily apparent from the description of the invention presented herein that it is readily adapted for holding a variety of types of work-pieces, both of the low density and the high density type. Metal castings, forgings, bar stock and plate stock as well as cellular core may be chucked for machining in accordance with the present invention. It is contemplated that this invention may be used with woven fabrics, such as suiting materials, which may be dampened, stacked in laminates, pressed and frozen into a high density composite, then chucked and machined to a given pattern to achieve high production cutting by the garment industry. Plastics, wood, paper and synthetic materials of various kinds may also be chucked and machined in accordance with the teachings of the present invention.

While certain preferred embodiments of the invention have been specifically disclosed it is understood that the invention is not limited thereto as many variations will be readily apparent to those skilled in the art and the invention is to be given its broadest possible interpretation within the terms of the following claims.

What we claim is:

1. Work-piece holding apparatus comprising a supporting base for a work-piece, a fluid substance provided at the plane of contact between said work-piece and a surface of said supporting base, said fluid substance being adapted to assume a solid state on withdrawal of heat therefrom and to revert to fluid state on application of heat, a source containing an appropriately chilled fluid medium, a source containing an appropriately heated fluid medium, said supporting base having a construction permitting the application of the chilled fluid medium and the heated fluid medium from said sources thereto respectively to lower and raise the temperature thereof dependent on the temperature of the fluid medium applied, controllable means adapted alternately to apply chilled fluid medium to said supporting base to lower the temperature thereof to a degree which changes said fluid substance to its solid state to effect cohesion of said work-piece to said supporting base during a work operation and to apply heated fluid medium to said supporting base to raise the temperature thereof to a degree which will return said fluid substance from its solid to its fluid state to effect release of said work-piece from said supporting base when the work operation is completed, and means for applying said chilled fluid medium to said work-piece during machining operation thereon to prevent heat generated thereby from inadvertently releasing said work-piece.

2. Work-piece holding apparatus comprising a supporting base assembly for a work-piece, means for applying a fluid substance to said supporting surface comprising a porous compressible fluid filled material placed over said work-piece positioned thereon, and means for compressing said material to thereby release said fluid substance therefrom, said fluid substance thereby flowing to said supporting surface around and adjacent to points of contact with said work-piece, said fluid substance being adapted to assume a solid state on withdrawal of heat therefrom and to revert to fluid state on application of heat, said supporting base comprising a platen member having a plurality of passageways therethrough, and an overplaten positioned on said platen and having a work-piece supporting surface, means for holding said overplaten to said platen member, means for circulating a fluid medium through the passageways of said platen member to change the temperature thereof, means for cooling said fluid medium, said chilled fluid medium when circulated serving to lower the temperature of said platen member and overplaten to a degree which changes said fluid substance to its solid state to effect cohesion of said work-piece to the supporting surface of said overplaten during a work operation, and means for affording heat at said overplaten to raise the temperature of said fluid substance to return it from its solid to its fluid state to effect release of said work-piece from said overplaten when the work operation is completed.

3. Work-piece holding apparatus comprising a supporting base assembly for a work-piece, a fluid substance provided at the plane of contact between said work-piece and said supporting base assembly, said fluid substance being adapted to assume a solid state on withdrawal of heat therefrom and to revert to fluid state on application of heat, said supporting base comprising a platen member having a plurality of passageways therethrough permitting the flow of a fluid medium therethrough to lower and raise the temperature thereof dependent on the temperature condition of the fluid medium applied, an overplaten positioned on said platen and having a work-piece supporting surface, means for holding said overplaten to said platen member, an attaching plate, and insulation between said attaching plate and said platen member, a first source containing an appropriately chilled fluid medium, a second source containing an appropriately heated fluid medium, and controllable means adapted alternately to apply the chilled fluid medium from said first source to said platen member to lower the temperature thereof and of said overplaten to a degree which changes said fluid substance to its solid state to effect cohesion of said work-piece to the supporting surface of said overplaten during a work operation and to apply the heated fluid medium from said second source to said platen member to raise the temperature thereof and of said overplaten to a degree which will return said fluid substance from its solid to its fluid state to effect release of said work-piece from said overplaten when the work operation is completed.

4. The method of holding a work-piece in desired position to permit a work operation on said work-piece comprising placing the work-piece on a surface of a supporting member, placing a source of a fluid substance upon said work-piece, said fluid substance being adapted to assume a solid state on withdrawal of heat therefrom and to revert to its fluid state on application of heat, forcing said fluid substance from its source for application at the plane of contact between said work-piece and said surface, lowering the temperature of said supporting member to a degree which changes said fluid substance to its solid state to effect cohesion of said work-piece to said surface, maintaining said lowered temperature condition of said supporting member during a work operation, and raising the temperature at said surface to a degree which will return said fluid substance from its solid to its fluid state to effect release of said work-piece from said surface when a work operation is completed.

5. The method of holding a work-piece in desired position to permit a work operation on said work-piece comprising providing a work-piece supporting member having passageways adapted for passage of a fluid medium therethrough, placing the work-piece on a surface of said supporting member, placing a source of a fluid substance upon said work-piece, said fluid substance being adapted to assume a solid state on withdrawal of heat therefrom and to revert to its fluid state on application of heat, forcing said fluid substance from its source for application at the plane of contact between said work-piece and said surface, circulating a fluid medium in a chilled state through the passageways of said supporting member to lower the temperature thereof to a degree which changes said fluid substance to its solid state to effect cohesion of said work-piece to said surface, continuing the circulating flow of said chilled fluid medium during a work operation on said work-piece, stopping the flow of said chilled fluid medium, and thereafter circulating a fluid medium in a heated state through said supporting member to raise the temperature thereof to a degree which will return said fluid substance from its solid to its fluid state to effect release of said work-piece from said surface when a work operation is completed.

References Cited in the file of this patent

UNITED STATES PATENTS

| | | |
|---|---|---|
| 995,537 | Herter et al. | June 20, 1911 |
| 2,124,110 | Hall | July 19, 1938 |
| 2,397,827 | Williams | Feb. 8, 1945 |
| 2,471,718 | Breck | May 31, 1949 |
| 2,600,842 | Buecken | June 17, 1952 |
| 2,629,230 | Turner | Feb. 24, 1953 |
| 2,641,879 | Dalrymple | June 16, 1953 |
| 2,701,455 | Kleist | Feb. 8, 1955 |
| 2,855,664 | Griffith | Oct. 14, 1958 |

OTHER REFERENCES

Technical Outlook, July 30, 1956, page 91.